United States Patent

Evans et al.

[11] Patent Number: 6,069,947
[45] Date of Patent: May 30, 2000

[54] COMMUNICATION SYSTEM ARCHITECTURE AND OPERATING PROTOCOL THEREFOR

[75] Inventors: Stephen Rhylant Evans, Welwyn Garden City; Julian Frank Barry Cable, Bishops Stortford; Stephen Leonard Fagg; Sarah Lucy Wright, both of Harlow, all of United Kingdom

[73] Assignee: Nortel Networks Corporation, Montreal, Canada

[21] Appl. No.: 08/991,272

[22] Filed: Dec. 16, 1997

[51] Int. Cl.[7] ...................................................... H04M 3/00
[52] U.S. Cl. ............................................. 379/229; 379/269
[58] Field of Search .................................... 379/229, 230, 379/269, 219, 220, 221, 207, 242; 370/464, 465, 466, 467

[56] References Cited

U.S. PATENT DOCUMENTS

| | | | |
|---|---|---|---|
| 4,996,685 | 2/1991 | Farese et al. | 370/352 |
| 5,414,762 | 5/1995 | Flisik et al. | 379/201 |
| 5,517,563 | 5/1996 | Norell | 379/269 |
| 5,553,127 | 9/1996 | Norell | 379/207 |
| 5,678,006 | 10/1997 | Valizadeh et al. . | |
| 5,778,059 | 7/1998 | Loghmani et al. | 379/201 |
| 5,822,420 | 10/1998 | Bolon et al. | 379/230 |
| 5,822,422 | 10/1998 | Daase et al. | 379/201 |

FOREIGN PATENT DOCUMENTS

| | | |
|---|---|---|
| 0 743 778 A2 | 11/1996 | European Pat. Off. . |
| 2 323 249 | 9/1998 | United Kingdom . |
| 95/34974 | 12/1995 | WIPO . |

Primary Examiner—Scott Wolinsky
Attorney, Agent, or Firm—Lee, Mann, Smith, McWilliams, Sweeney & Ohlson

[57] ABSTRACT

A connection broker (44), located between lower-level system entities (16, 58, 264) associated with a narrowband-broadband interface (250) and a call server (18) that controls call connection across the narrowband-broadband network, contains a memory (251) that stores connection-related information and protocol converters. The connection broker (44) accesses the protocol converters to interpret control messages received from the call server (18) and, where necessary, transposes messages for the call server into a standardised format for use over a uniform fabric application interface (66). Control messages pertaining to connection paths within the narrowband-broadband network (250) and relayed via the connection broker (44) are appropriately phrased (by the connection-related information and protocol converters) to ensure that meaningful information and instruction is communicated between the call server (18) and the lower-level system entities (16, 58, 264). Use of the protocol converters therefore enables connection attributes and network operation and configuration to be altered and advised in-call by having the connection broker (44) both change connection-related information and communicate any change in network configuration to the call server and lower-level system entities, as appropriate.

31 Claims, 11 Drawing Sheets

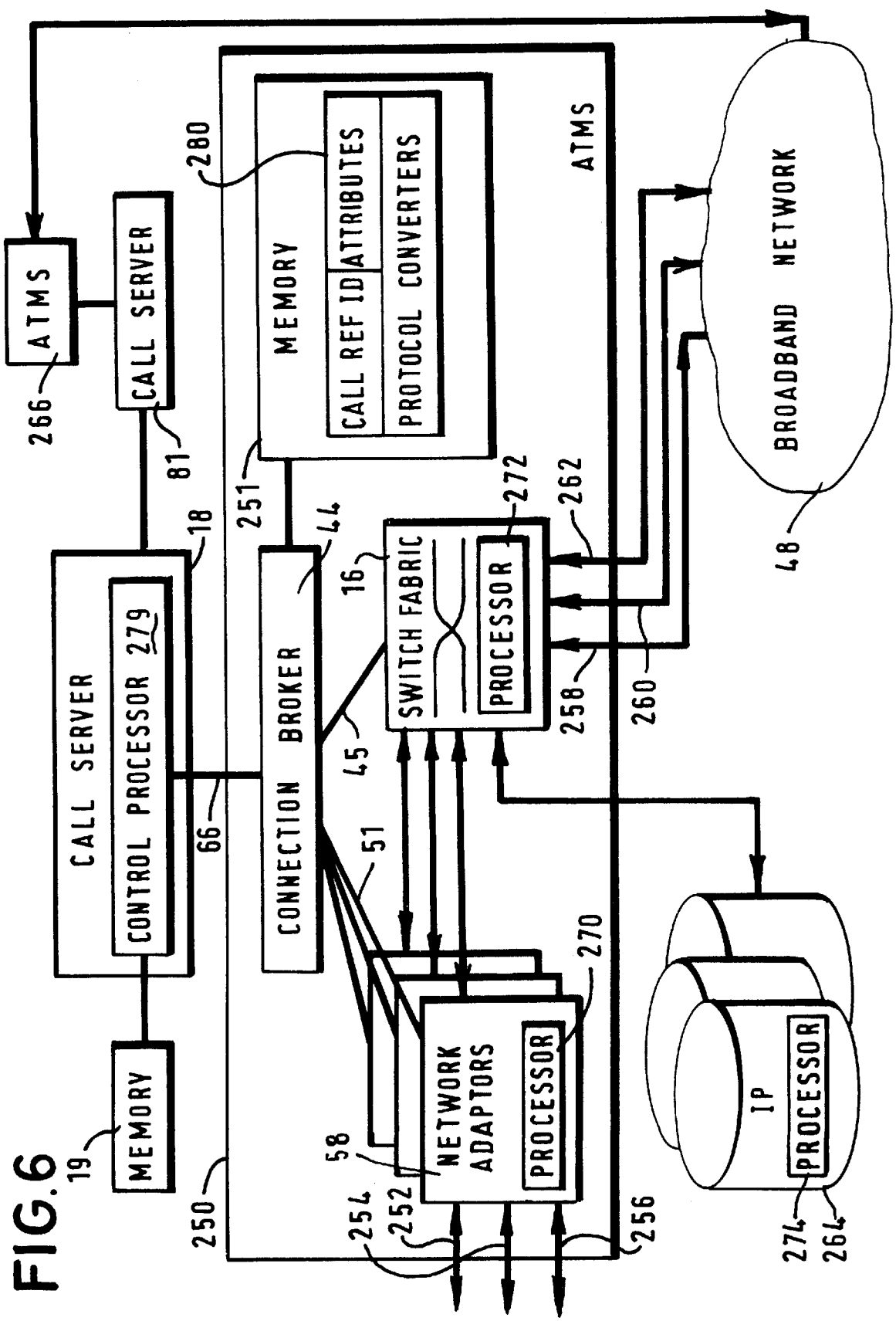

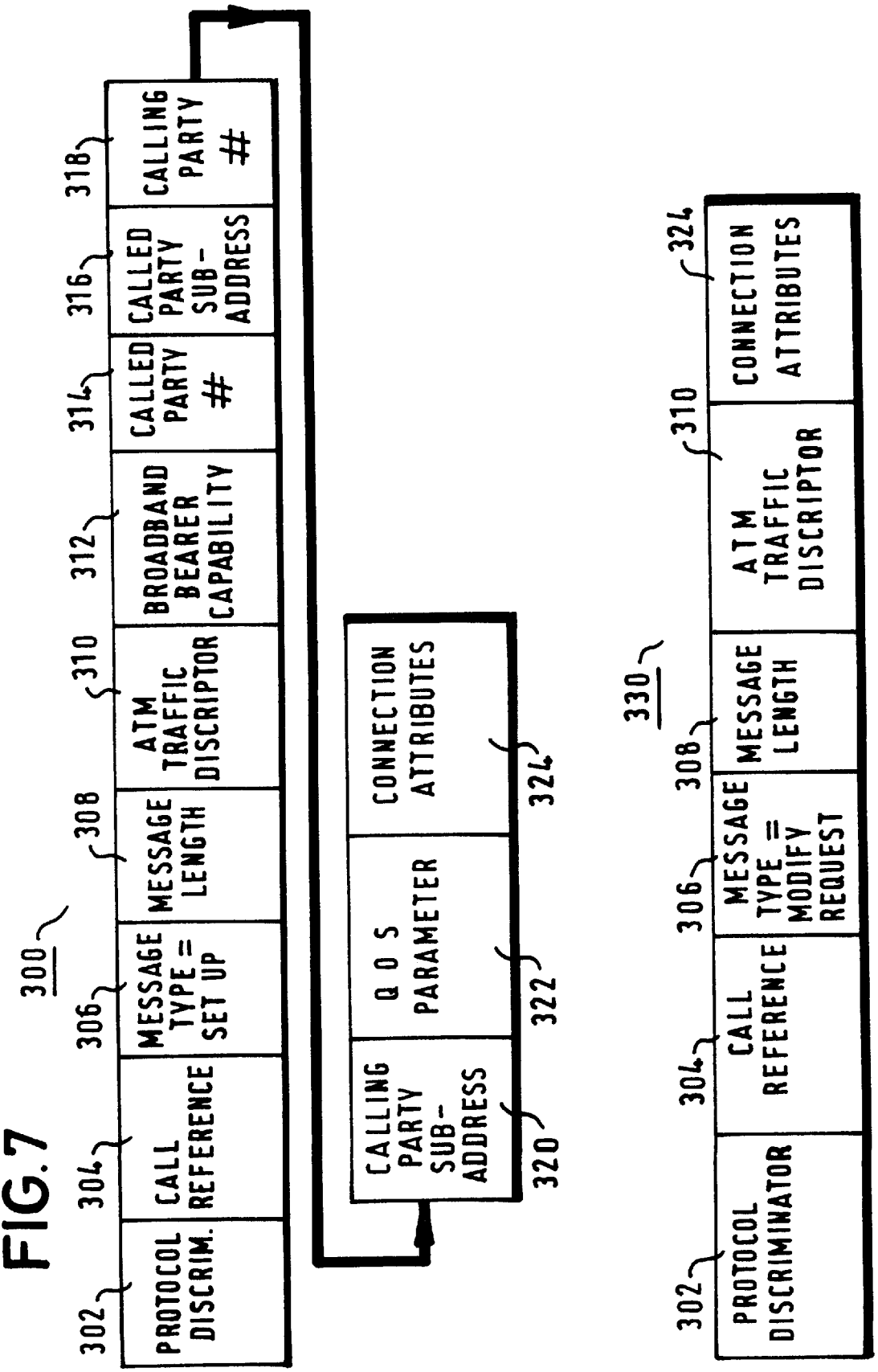

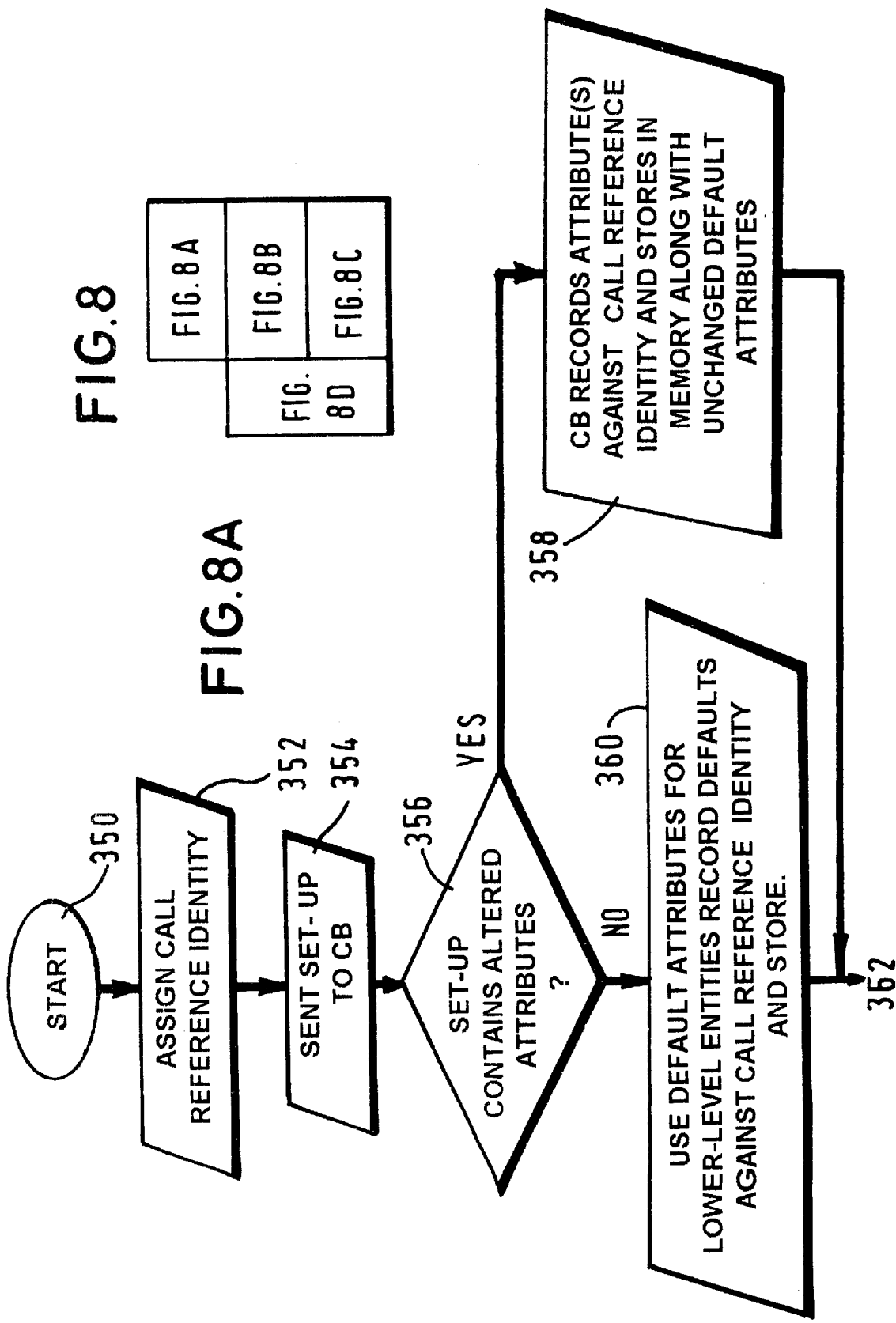

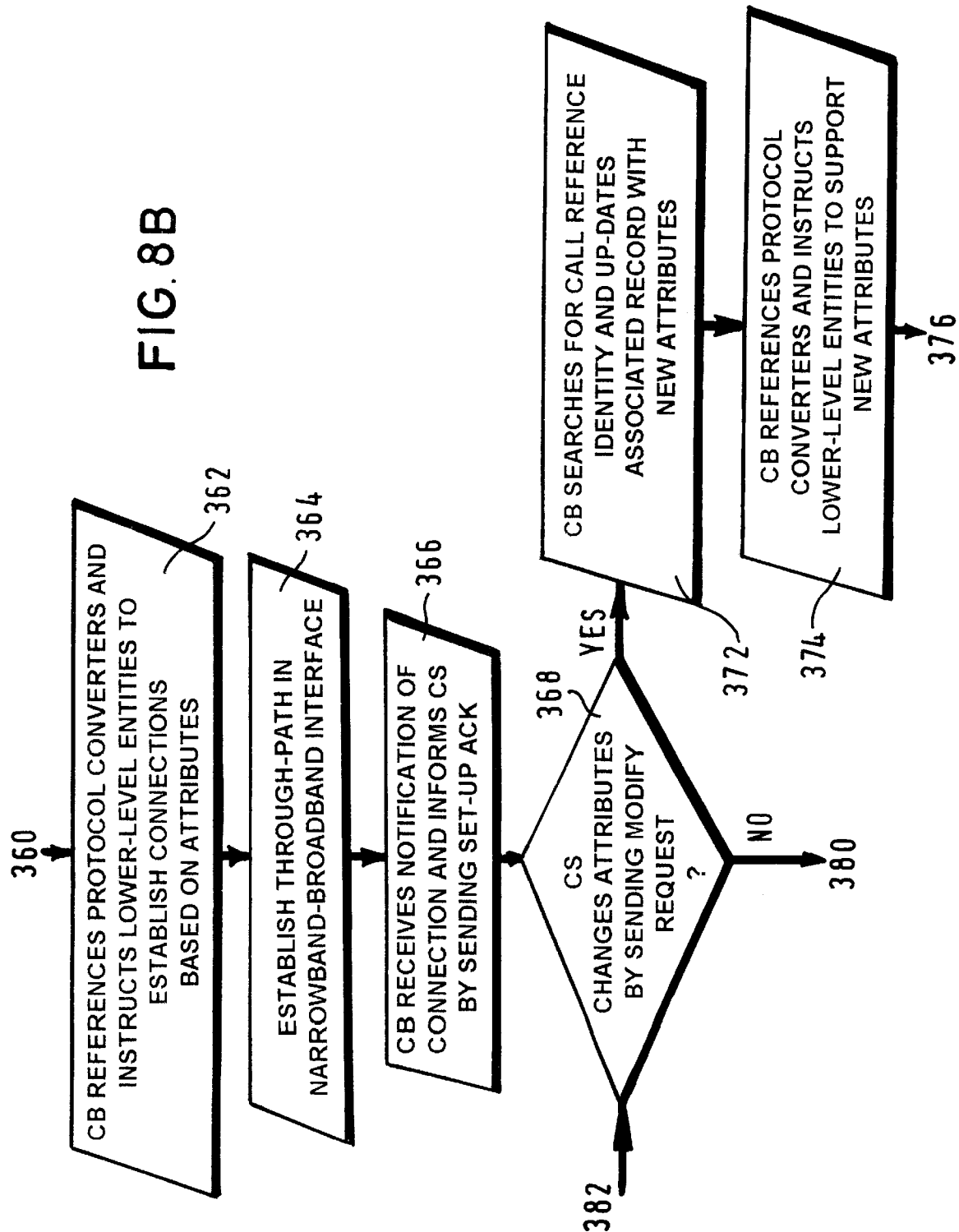

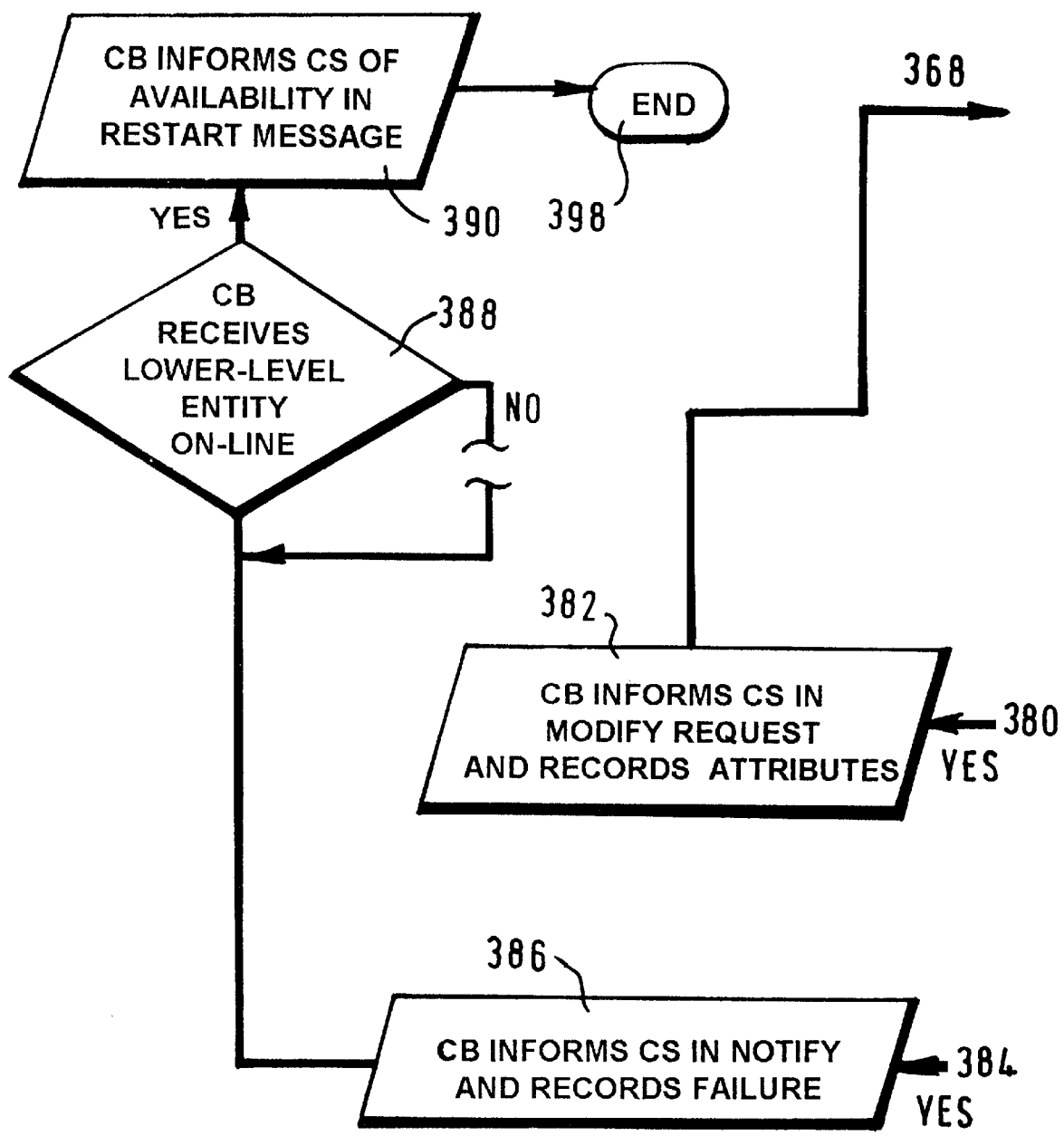
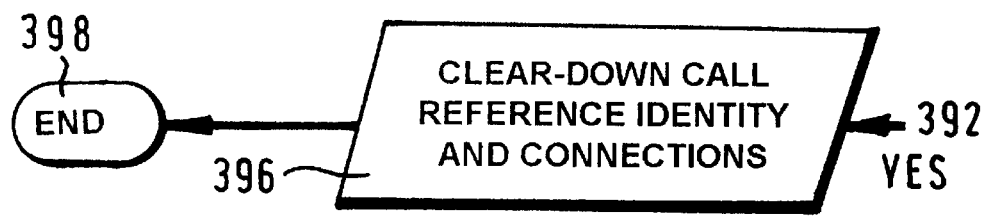
FIG.8D

COMMUNICATION SYSTEM ARCHITECTURE AND OPERATING PROTOCOL THEREFOR

RELATED PATENT APPLICATIONS

The present application is related to: i) co-pending U.S. patent application Ser. No. 08/907,521 [Applicant's reference FPUS97518/ID0722] filed on Aug. 8, 1997 in the name of J. F. B. Cable et al. and assigned to Northern Telecom Limited, which co-pending US patent application is further identified by its title "SYSTEM AND METHOD FOR ESTABLISHING A COMMUNICATION CONNECTION"; and ii) co-pending UK patent application number 9720920.9 [Applicant's reference PUK97674/ID0835] filed on Oct. 1, 1997 in the name Northern Telecom Limited, which co-pending UK patent application is further identified by its title "COMMUNICATION SYSTEM ARCHITECTURE AND OPERATING METHODS THEREOF" and the first named inventor R. H. Mauger.

BACKGROUND TO THE INVENTION

This invention relates, in general, to an architecture for a communication system and an operating protocol therefor, and is particularly, but not exclusively, applicable to network architectures that combine narrowband call control, services and routing with broadband connectivity. More especially, the present invention is applicable to a fabric application interface arranged to interconnect a narrowband communication network to a broadband communication network.

SUMMARY OF THE PRIOR ART

Globally, telecommunication systems are, generally, in a transitional phase between second generation, narrowband digital networks (such as the Global System for Mobile (GSM) cellular communication system) and future, multi-media digital networks (such as the Universal Mobile Telecommunication System (UMTS)) having broadband capabilities. This transition is necessarily required to support higher data rate communications, including video and internet applications, presently being proposed and made available. Unfortunately, this transitional phase also presents system operators with several dilemmas, and prejudices immediate implementation of such broadband systems. For example, until such a time when a free-standing broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments that would have to be re-implemented for deployment in broadband networks. Consequently, present-day narrowband systems must be adapted to accommodate both narrowband and broadband users, with this statement particularly relevant to service and system management, call establishment and inter-working procedures between these different forms of network.

For an effective migration between narrowband and broadband systems (for the transitional phase), system operators must particularly consider an inter-working scenario when all subscribers connect to a narrowband network, but one or more intermediate broadband networks are used to relay information between these narrowband subscribers. Any interim solution should also optimise service and system management, while also providing infrastructure equipment that can be re-used in a fully-fledged broadband environment.

In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another. Routing and relaying functions are therefore core to the development of an efficient system having optimised service capabilities, with operator profits and subscriber service charges inherently entwined with such optimisation.

Taking GSM as an exemplary form of a narrowband digital network, user and control information (or "data") is interleaved, using time division multiplexing (TDM), on a 64 kbit per second (kbps) pulse code modulated (PCM) bearer channel Indeed, these bearer channels can each be framed to support four voice calls of 16 kbps, comprised from 13 kbps of sampled and encoded speech and 3 kbit/s of ancillary information, such as parity check and correction bits (and the like) and synchronisation information Data is then relayed across a node by some form of synchronous TDM switching fabric, often of the 'time-space-time' type Control information (e.g. call set-up and tear-down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

On the other hand, broadband digital networks are characterized in that user and control information is transmitted in fixed or variable length 'packets', with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

With respect to call set-up and in-call signalling across a prior art fabric application interface (FAI) between a high-level system control entity (i.e. a network controller) and a switch fabric (that routes narrowband trunks to ATM cells on broadband virtual circuits, for example), prior art signalling schemes merely effect switch fabric operation and connectivity. For example, if we consider the "MODIFY REQUEST" primitive in Q.2931 signalling (defined in International Telecommunication Union—Telecommunication Standard (ITU-T) Q.2963.1), the system controller uses this signalling message in-call to instruct the switch fabric to re-configure its output port configuration, for example.

Another significant problem associated with prior art narrowband-broadband interfaces arises with architectural change. For example, the introduction of new or up-graded infrastructure can have unwanted ramifications throughout the entire communication system because changes in the inter-working relationships between the network controller and the narrowband-broadband interface can potentially both alter the underlying meaning of signalling messages and change network identities and addresses. Consequently, network providers can be discouraged from implementing the further development of existing networks since global system changes may be required, with such system changes being both time consuming and complex in nature.

To facilitate use of broadband networks and the migration of communication networks to high data rate technologies (e.g. the 2 Mbps rate envisaged within UMTS), there is a need to provide an effective mechanism for interconnecting narrowband networks through a transparent broadband ether, while also providing an easy migration to more advanced systems. Indeed, the broadband ether must accommodate and support narrowband signalling schemes without affecting either data integrity or in any way inhibiting data flow or interconnection. Furthermore, to encourage subscription to broadband services, operators must provide a reliable but relatively low-cost (and hence optimised) communication system architecture.

SUMMARY OF THE INVENTION

According to a first aspect of the present invention there is provided a communication network comprising: a call server arranged to administer control of at least a portion of the communication network; a plurality of interconnectable low-level system entities controllable by the call server and configurable to provide a plurality of circuits that support a flow of data within the communication network, and a connection broker coupled to the call server and the plurality of low-level system entities and arranged to relay system configuration messages between the call server and the plurality of low-level system entities, the connection broker having: a memory-processor combination arranged to store and access, as necessary, protocol converters in response to receipt of system configuration messages from one of the call server and the plurality of low-level system entities to facilitate and provide intelligible system configuration messages to a respective one of the plurality of low-level system entities and the call server.

Typically, the connection broker is coupled to the call server through a fabric application interface supporting a first signalling scheme, whereas the connection broker is coupled to the plurality of low-level system entities through a plurality of control buses at least one of which uses a second signalling scheme different to the first signalling scheme.

In a second aspect of the present invention there is provided a method of communicating system configuration messages between a call server arranged to administer control of at least a portion of a communication network and a plurality of interconnectable low-level system entities controllable by the call server and configurable to provide a plurality of circuits that support a flow of data within the communication network, the communication network further comprising a connection broker coupled to the call server and the plurality of low-level system entities and wherein the connection broker has a memory and a processor, the method comprising the steps of: storing in the memory protocol converters that translate system configuration messages between a first signalling format and at least one other different signalling format; relaying system configuration messages between the call server and the plurality of low-level system entities via the processor of the connection broker and, as necessary, having the processor access the protocol converters in response to receipt of system configuration messages from one of the call server and the plurality of low-level system entities to facilitate and provide intelligible system configuration messages to a respective one of the plurality of low-level system entities and the call server.

In a third aspect of the present invention there is provided a connection broker for coupling between a call server arranged to administer control of at least a portion of a communication network and a plurality of interconnectable low-level system entities controllable by the call server and configurable to provide a plurality of circuits the connection broker responsive to and arranged to relay system configuration messages between the call server and the plurality of low-level system entities, the connection broker having: a memory-processor combination arranged to store and access, as necessary, protocol converters in response to receipt of system configuration messages from one of the call server and the plurality of low-level system entities to facilitate and provide intelligible system configuration messages to a respective one of the plurality of low-level system entities and the call server.

In a further aspect of the present invention there is provided a method of altering connection attributes associated with a connection established by a call server of a communication system and routed via circuits responsive to lower level system entities controlled by the call server, the lower level system entities coupled to the call server via an intermediate connection broker that acts as a control interface between the call server and the plurality of lower level system entities, the method comprising the steps of: storing within the communication system an initial set of connection attributes for the connection; receiving at the connection broker a message identifying an alteration in the connection attributes associated with the connection; sending a control message from the connection broker notifying the alteration of the connection attributes associated with the connection; and changing the initial set of connection attributes associated with the connection in response to receiving the control message from the connection broker.

In another aspect of the present invention there is provided a connection broker providing a control interface between a call server arranged to administer control at least a portion of a communication network and a plurality of interconnectable low-level system entities controllable by the call server and configurable to provide a plurality of connections, the connection broker responsive to and arranged to relay a system configuration message between the call server and the plurality of low-level system entities, the connection broker having a controller arranged to send, in response to receipt of the system configuration message, an attribute instruction that causes a change in a configuration of the plurality of lower level system entities.

In yet another aspect of the present invention there is provided a communication network comprising: a call server arranged to administer control the communication network; a plurality of interconnectable low-level system entities controllable by the call server and configurable to provide a plurality of circuits that support a flow of data within the communication network; and a connection broker coupled to the call server and the plurality of low-level system entities and arranged to relay system configuration messages between the call server and the plurality of low-level system entities, the connection broker having a controller arranged to send, in response to receipt of the system configuration message, an attribute instruction that causes a change in a configuration of the plurality of lower level system entities.

Advantageously, the present invention provides a communication system architecture that supports a uniform fabric application interface between a call server that exhibits overall control of a network or interface and lower level system entities responsible for the physical interconnection of circuits either across networks or to ancillary service devices, such as intelligent peripherals. In this way, the communication system can be modified, up-graded or enhanced through the provision of additional or altered lower level system entities with only minimal changes, of any, required to an intermediate control device, namely the connection protocol. As such, the call server does not need to understand or interpret proprietary or different signalling schemes used to communicate information between the connection broker and the lower level system entities.

BRIEF DESCRIPTION OF THE DRAWINGS

An exemplary embodiment of the present invention will now be described with reference to the accompanying drawings, in which.

FIG. 6 is a basic block diagram of a communication system architecture according to a preferred embodiment of the present invention:

FIG. 7 shows typical frame structures of SET-UP and MODIFY REQUEST primitives of a Q.2931-based signalling scheme, and FIG. 8 (including FIGS. 8A–8D) is a flow process detailing a preferred operating mechanism for the communication system architecture of FIG. 6.

DETAILED DESCRIPTION OF A PREFERRED EMBODIMENT

Figure 1:
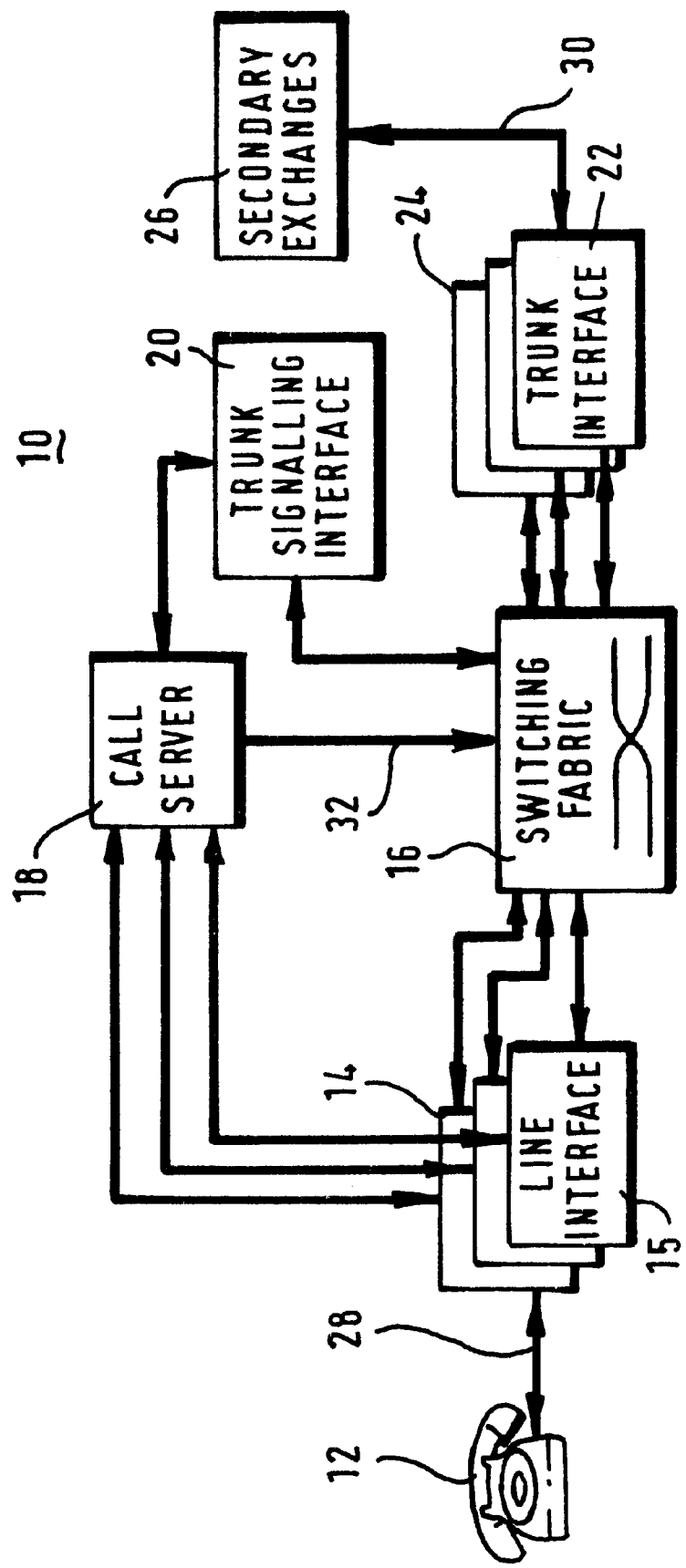
FIG. 1 is a block diagram illustrating an abstract model of a narrowband communication node.

There are, apparently, two principal ways of implementing the interconnection of narrowband subscribers units through an intermediate broadband network, such as an asynchronous transmission mode (ATM) architecture, either an inter-working function can be implemented at each boundary between the narrowband and broadband networks (in which a dedicated and reversible coding transposition is applied to the respective narrowband-broadband information), or narrowband information can be encapsulated over a broadband subnet whereby the narrowband information is packaged with a broadband frame structure (so entirely maintaining the integrity and format of the original encoded narrowband information). In relation to user information, e.g. encoded speech or specific data traffic, it has been identified that both the inter-working function and encapsulation mechanisms are possible and merely represent an additional process step that complicates and extends the requirements for coding within communication systems, generally. However, in relation to control information (which is required to establish and maintain a connection), there are a number of penalties and benefits associated with both of the above approaches. Specifically, encapsulation allows existing services to be supported, even though these services may not independently be sustained by the broadband network. Furthermore, encapsulation is simple to implement. On the other hand, inter-working requires only a local view at each inter-working point (i.e. at the narrowband-broadband boundary), and also provides a mechanism that can support the participation of narrowband and broadband subscribers in a single call Referring to FIG. 1, a block diagram illustrating an abstract model of a narrowband communication node 10 is shown. A number of subscriber terminals 12, such as land-line telephones or modems, are coupled, typically, to a plurality of line interfaces 14–15 (although only one need be supplied for an operational system). The plurality of line interfaces 14–15 are each connected to a switching fabric 16 that is arranged to route an input of the switching fabric 16 to an appropriate output thereof, as will readily be appreciated. The plurality of line interfaces 14–15 are also coupled (usually on an individual basis) to a call server 18 arranged to administer and control, for example, the set-up and tear-down of calls across the narrowband network 10. The call server 18 is further coupled to the switching fabric 16. A trunk signalling interface 20, that acts to decode and interpret signalling schemes used within the narrowband network 10, is coupled between the call server 18 and the switching fabric 16. Outputs from the switching fabric 16 are coupled to a plurality of trunk interfaces 22–24 (although only one need be supplied for an operational system). The plurality of trunk interfaces are further coupled to secondary exchanges 26 such as PBXs or BSSs, within the narrowband network 10.

As will be appreciated, the term "subscriber terminal" is used merely to describe a particular endpoint connection for a line or trunk interface.

User information (traffic) 28–30 enters the narrowband infrastructure via line interfaces 14–15 or trunk interfaces 22–24. Control information from individual subscribers enters via the line interfaces 14–15, whereas control information, i.e. inter-node signalling, from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrowband systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Figure 2:
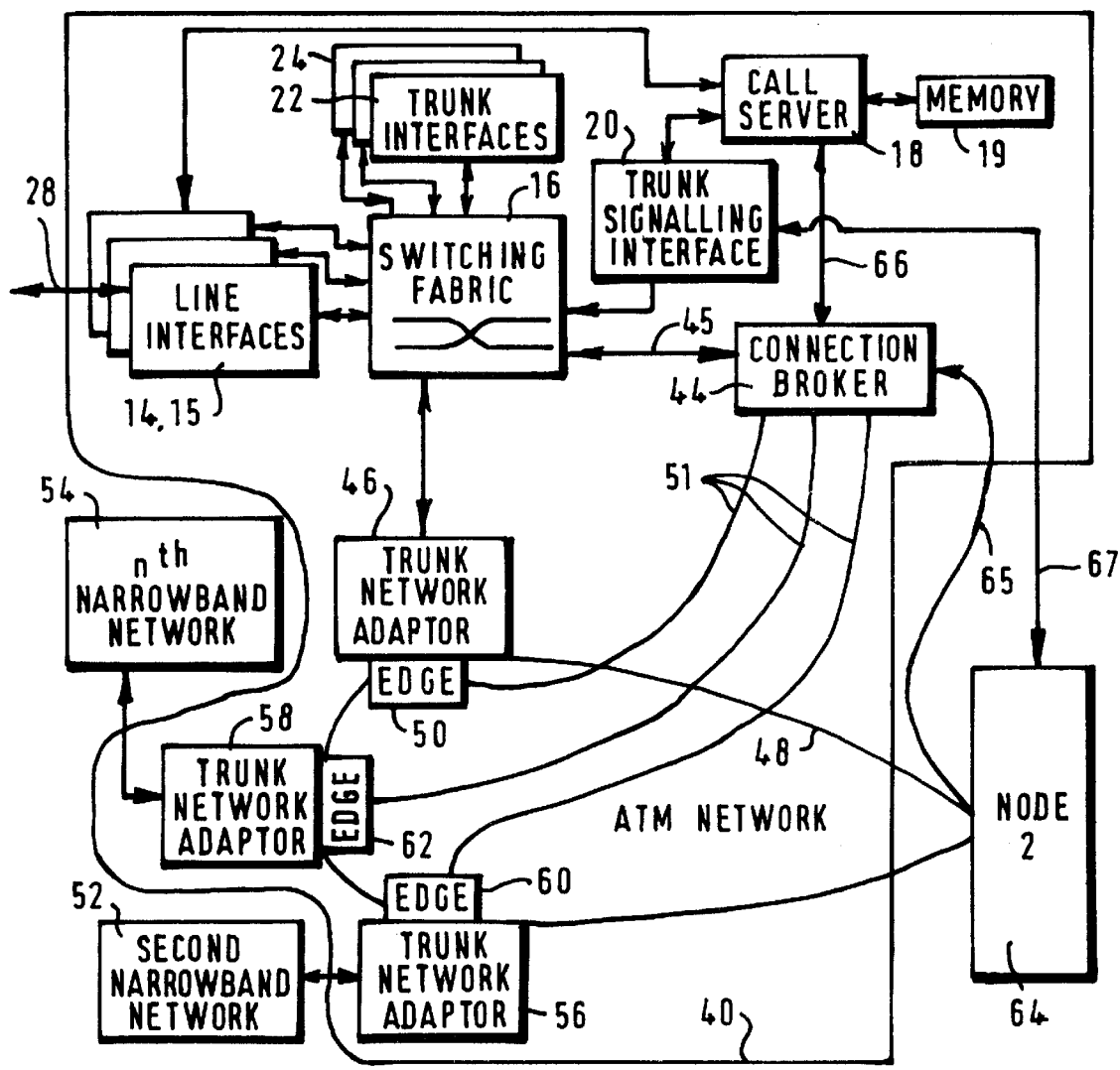
FIG. 2 is a block diagram illustrating an underlying principle for subscriber terminal interconnection between narrowband and broadband networks, as required in the present invention.

Turning now to FIG. 2, there is shown a block diagram illustrating an underlying principle for subscriber terminal interconnection between narrowband and broadband networks, as required in the present invention. In this figure, a broadband network is used to transport the user and/or control information. To facilitate an understanding of the architectural differences between the conventional narrowband network of FIG. 1 and the broadband network adjunct that interconnects narrowband networks, common infrastructure is labelled with identical reference numerals.

At a first node 40, a number of subscriber terminals, such as landline telephones or modems (not shown for the sake of clarity), are coupled, typically, to a plurality of line interfaces 14–15 (although only one need be supplied for an operational system) of a narrowband system. The plurality of line interfaces 14–15 are each connected to a switching fabric 16 that is arranged to route an input of the switching fabric 16 to an appropriate output thereof. The plurality of line interfaces 14–15 are also coupled (usually on an individual basis) to a call server 18 arranged to administer and control, for example, the set-up and tear-down of calls across the narrowband network.

The call server is coupled to a memory that is arranged to store, amongst other things, circuit indicators codes (CICs) associated with both real trunks and "phantom trunks"; the purpose of the latter will be described subsequently. More particularly, the memory can record a "busy" or "vacant" status against each of these real or phantom trunks. The call server 18 is further coupled to a connection broker 44, which in turn is coupled to the switching fabric 18 via bus 45. The connection broker 44 represents a first departure in the system architecture of the present invention from the conventional narrowband network FIG. 1. A trunk signalling interface 20, arranged to act to decode and interpret signalling schemes used within the narrowband network, is coupled between the call server 18 and the switching fabric 16. Outputs from the switching fabric 16 are coupled to a plurality of trunk interfaces 22–24, (although only one need be supplied for an operational system. The plurality of trunk interfaces are again coupled to secondary exchanges (not shown for the sake of clarity), such as PBXs or BSSs, within the narrowband network.

The switching fabric 16 is further coupled to a first trunk network adapter 46 that allows interconnection and interoperability of the narrowband network with a broadband network 48 implemented, for example, for asynchronous transmission mode (ATM) operation. More particularly, interconnection of the trunk network adapter 46 is through a broadband network edge switch 50. that is coupled to and hence controlled by the connection broker 44 by control lines (or buses) 51 The combined function of the trunk network adapter 46 and the broadband network edge switch 50 will be described subsequently. Other narrowband networks 52–54 are coupled, in a similar fashion, to the broadband network 48 via respective trunk network adapters 58–60 and broadband network edge switches 60–62. As will be appreciated, other narrowband networks 52–54 will be realised through infrastructure architectures similar to that described immediately above.

The broadband network 48 is further coupled to a second node 64, typically a different network, which is also responsive to the connection broker 44 via connection (or control line or control bus) 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone networks, e.g. distinct narrowband networks operated by different operators.

Narrowband signalling within the communication system generally, is controlled by the call server 18, while broadband signalling, i.e. signalling that may be sent between different narrowband networks 52–54 via the intermediate broadband network 48, is controlled by the connection broker 44. Consequently, the call server 18 is not concerned with broadband signalling interconnection and operation.

The narrowband line interfaces 14–15, trunk interfaces 22–24 and switching fabric 16 are supplemented by a broadband network 48 and trunk (i.e. narrowband-broadband) network adapters 46, 56–58 that act to provide gateway functionality. Specifically, the trunk network adapters 46, 56–58 perform traffic (user information) interworking functions and signalling (control information) encapsulation, with the signalling ultimately relayed back to a call server 18.

The function performed by the connection broker 44 is used to provide a uniform connection abstraction 66 (i.e. a uniform fabric application interface. FAI) for the call server 18, independent of whether the connection crosses (and is retained entirely within) the narrowband network or the broadband network, or in the case where the connection crosses both the narrowband and broadband networks. This necessitates use of a uniform terminal name space identity (i.e. a standardised address format) for all terminals across the entire communication system, i.e. both narrowband and broadband systems.

For a narrowband to narrowband connection in a single narrowband network (e.g. owned by a particular operator), the connection broker 44 passes the connection messages to the switching fabric 16 (via connection 45), and therefore acts transparently in order to appear identical in function to the prior art narrowband network of FIG. 1. The switching fabric 16 of the narrowband network then establishes the connection in accordance with known techniques, and does not utilise the broadband network 43. For a broadband to broadband connection, the connection broker 44 instructs the broadband network and/or trunk network adapters 46, 56–58 to make or break a call connection, and therefore mimics standard broadband operation For a narrowband to broadband connection, however, both actions must be performed contemporaneously. Specifically, the connection broker 44 both instructs the switching fabric 16, through the call server 18 in the narrowband 25 network, to hold open a routing path for a call and negotiates with a trunk network adapter 46 of the broadband network for the allocation of a suitable channel resource. Once both paths have been determined, the connection broker 44 sends dedicated messages to the switching fabric 16 and the trunk network adapter 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, each typically having switchable narrowband-broadband capabilities and defined service capabilities. However, intermediate broadband networks may not be able to support these services (or any service of similar nature) nor be able to interpret narrowband control channel signalling required to set-up a defined narrowband services, i.e. there are different signalling protocols between the different adjacent exchanges. In this case, the interconnection of the narrowband networks (through the intermediate broadband network 48) requires the functional coordination of separate call servers and connection brokers located in the respective networks.

Figure 3:
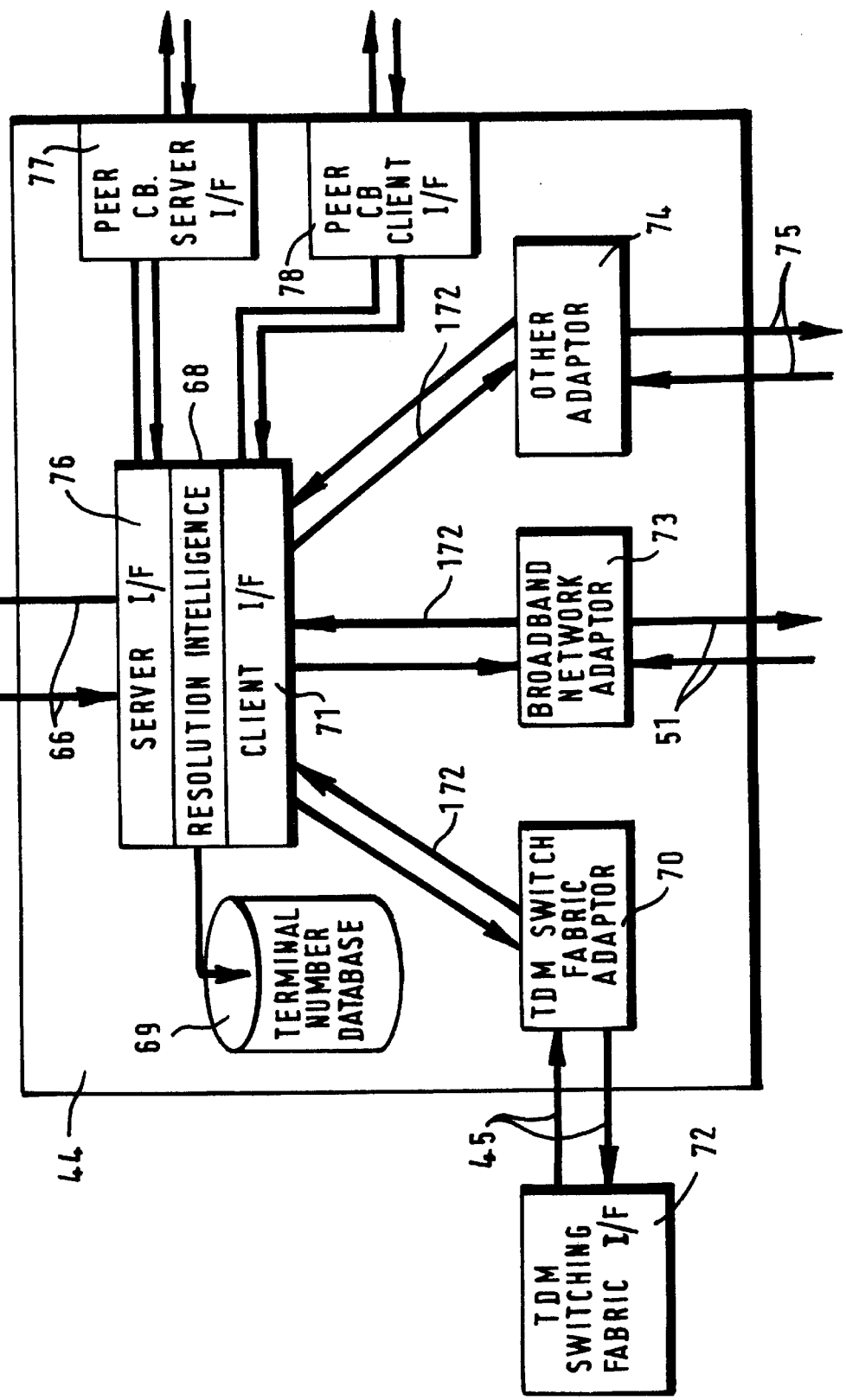
FIG. 3 illustrates an abstract architecture for a connection broker of FIG. 2.

Turning to FIG. 3, an abstract architecture for the connection broker 44 of FIG. 2 is shown. Although a hardware implementation is dependent upon (and hence determined by) specific requirements, a typical implementation extends the capabilities of an existing, narrowband telephone exchange. By way of example and explanation only, the connection broker 44 of FIG. 3 contains resolution intelligence 68 that is typically realised by a control processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adapter 70 (in the case of a TDM narrowband system) provides protocol conversion between the resolution intelligence 68 (via a client orientated interface port 71) and a TDM switching fabric interface 72 (analogous to the switching fabric 16 of FIG. 2). Typically, a dedicated connection protocol 172 is utilised between the resolution intelligence 68 and the TDM switching fabric adapter 70, although this need not be the case. A broadband network adapter 73 is also coupled through the client interface port 71 to the resolution intelligence 68, with communication between the resolution intelligence 68 and broadband network adapter 73 typically based on the dedicated connection protocol 172. The broadband network adapter is analogous to the trunk network adapter 46 of FIG. 2. Other adapters 74 for ancillary networks or services may also be coupled to the resolution intelligence 68 via the client interface 71. The broadband network adapter 73 and the other adapters 74 will accordingly be respectively coupled to the broadband network edge switch 50 via control lines 51 or appropriate communication resources 75. The resolution intelligence is also coupled to a server interface port 76 that provides an interconnection facility, via fabric application interface 66, to call server 18. The server interface port is also coupled through a secondary port 77 (termed a "peer connection broker server interface") arranged to interconnect the resolution intelligence 68 of the connection broker 44 to another connection broker (shown in FIG. 4). Similarly, the client interface port 71 is also coupled to a ternary port 78 (termed a "peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an inter-processor communications facility, while the switching fabric may be supported by a special purpose processor, as will be understood.

The connection broker 44 of FIG. 3 supports a set of real-time processes within a single fault tolerant processor, i.e. within the resolution intelligence 68. The inter-processor communications facility (supported by the dedicated connection protocols 172) of the connection broker is used to communicate with the switching fabric 16 and the call server 18. As has been previously described, the connection broker 44 typically incorporates broadband interfaces to enable control of the broadband network, although the connection broker may use the inter-processor communications facility to access the broadband interfaces on the trunk network adapters. However, as communication networks evolve to be more broadband-orientated, the call server 18 and connection broker 44 may reside on processors with only broadband interfaces that are connected directly to the broadband network 48. The narrowband connection fabric would then be provided with a broadband control interface.

Figure 4:
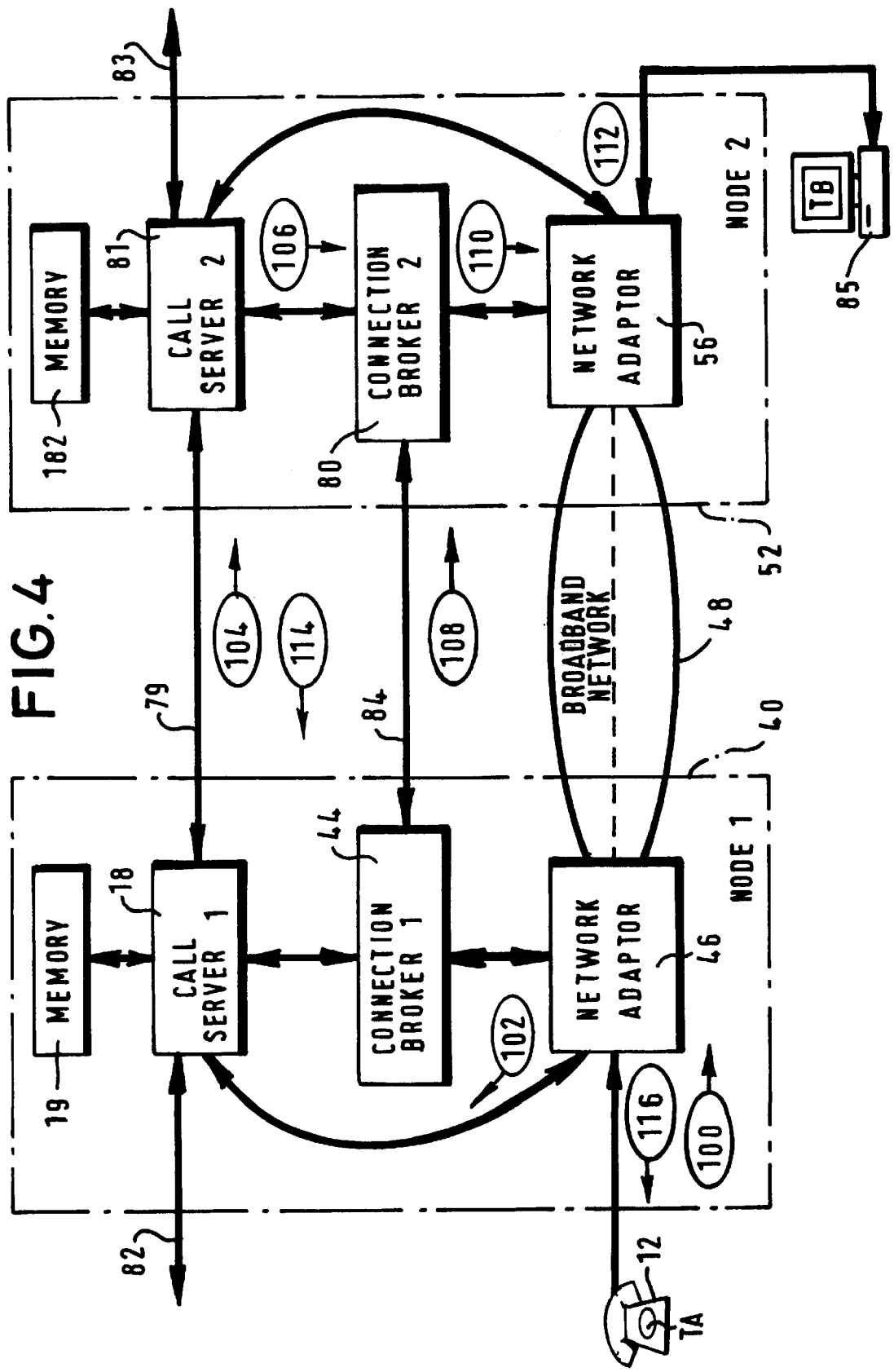
FIG. 4 is a representation of a system architecture and associated mechanism by which subscriber terminals can be connected across an intermediate broadband network.

A system architecture and associated mechanism for connecting subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, an existing common signalling relation between both narrowband nodes is utilised. It is the establishment of a common narrowband signalling link (or resource) 79 and protocol that provides interconnection across the system since the broadband network need only have the capability of relaying traffic between the narrowband networks. The broadband network consequently appears as a transparent channel resource since no modification of the narrowband traffic is required.

The first node 40 and the second node 52 both contain trunk network adapters 46 and 56, connection brokers 44 and 80, and call servers 18 and 81 which are coupled permanently together over the common narrowband signalling link 79 that provides a plurality of virtual (or "phantom") traffic trunks. The call servers 18 and 81 are therefore potentially connected to other call servers (not shown) of different narrowband networks (not shown) by additional signalling resources 82–83. The call servers 18 and 81 are respectively coupled to connection brokers 44 and 80 that in turn are coupled to respective trunk network adapters 46 and 56. The trunk network adapters 46 and 56 are coupled together through a broadband network 48, while the connection brokers 44 and 80 are interconnected by a virtual link 84. Terminal TA 12 is coupled to trunk network adapter 46, while terminal TB 85 is coupled to trunk network adapter 56.

The signalling link 79 is realised a permanent connection between the two call servers 18 and 81, although this connection may be dynamically assigned or provided by a radio frequency link. Indeed, in a scenario where the first node 40 and second node 52 pre-exist as narrowband gateway nodes between network A and network B, real narrowband E1 trunks already exist between these two exchanges and, as such, signalling can be carried in a time-slot of these E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless these multiple paths represent a single logical "signalling relation" by which SS7 user parts (i.e. the call servers) are able to communicate and interact.

The virtual link 84 established between the two connection brokers 44 and 80 offers a permanent "ability to communicate". The virtual link 84 therefore takes the form of an ATM virtual channel connection. However, it is also possible for an SS7 network to be used as the bearer for this communication, e.g. in relation to a TCAP application. The communication links between the connection brokers 44 and 80 and both the network adapters 46, 56 and the switching fabrics are also permanent, while connectors that carry traffic between the network adapters 46, 56 and the interconnected subscriber terminals TA 12. 85 are made and broken for the duration of a specific call or for particular portions of those calls.

This system operates by virtue of the provision of at least two (and probably tens to thousands of) assignable signalling channel resources or "phantom trunks" between the respective switching fabrics, principally residing between the respective call servers 18 and 81 and respective connection brokers 44 and 80. The nodes then utilise narrowband signalling to simulate the presence of virtual (or "phantom") terminals at either node. These phantom trunks are dedicated to a single node and, as such, the system only allows the formation of a call in one direction from the first node 40 to the second node 52 or vice versa. Thus, a phantom route between the two nodes consists of two groups of phantom trunks, one in each direction. By this mechanism, undesirable effects which could otherwise occur if the same phantom trunk was seized by each node trunk are prevented. Beneficially, the phantom trunks do not tie up real communication resources that exist between the respective narrowband networks.

Figure 5:
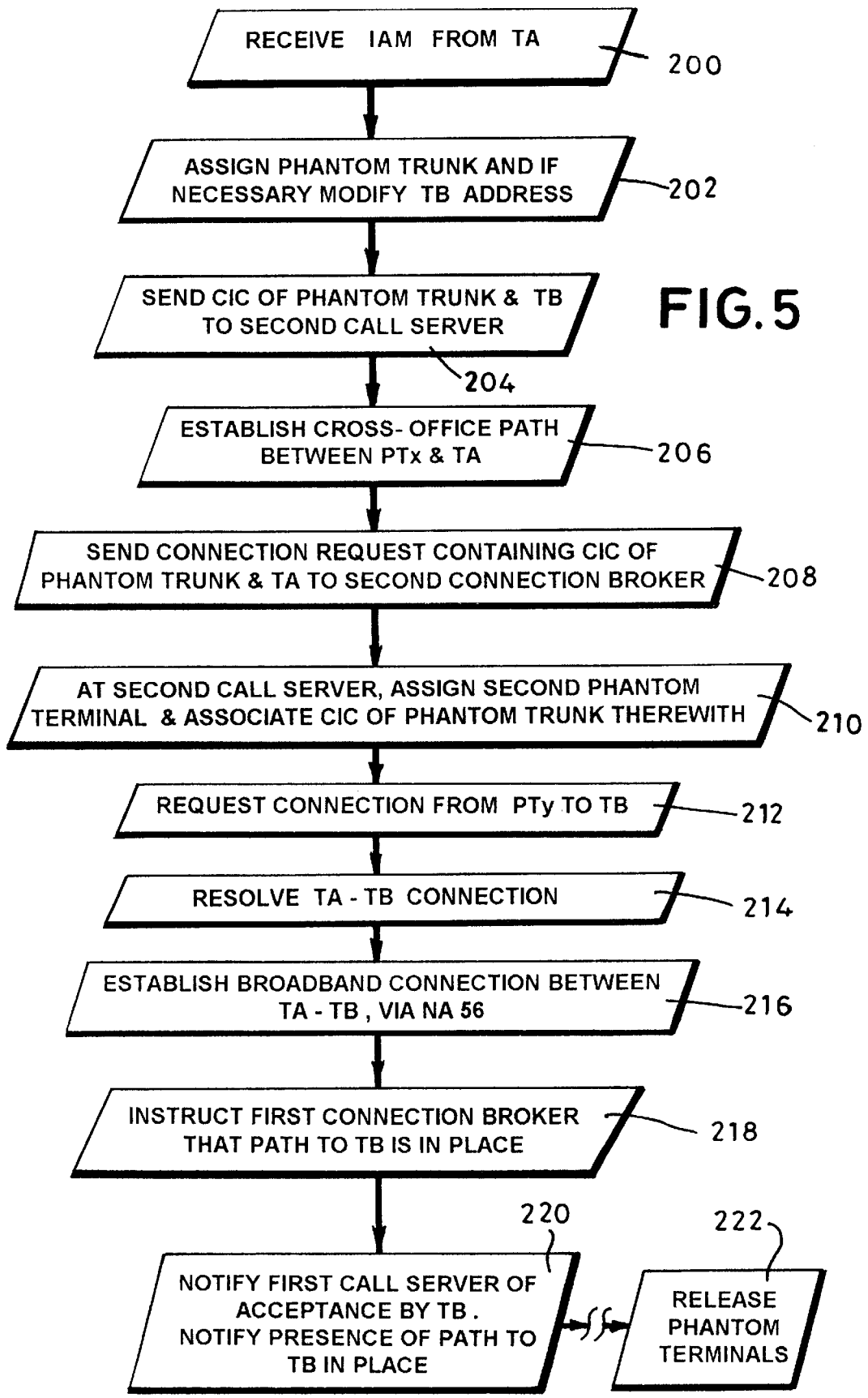
FIG. 5 is a flow diagram illustrating the procedural steps required in the present invention to establish a multi-node communication across a broadband network.

In relation to the structure, content and function of call set-up messages between different exchanges (i.e. different nodes), this can best be understood with reference to FIG. 4 and the flow diagram of FIG. 5 that illustrates the procedural steps required to establish a multi-node communication across a broadband network.

An incoming call (or "initial address message", IAM) from terminal TA is received 200 at the first node 40, whose call server 18 receives the incoming message and determines that the call must be routed to the second node 52 The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can support 64 kbps speech, for example), the first call server 18 selects a free phantom terminal PTx and then uses this phantom terminal to establish 202 a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact, identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay 204 a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. Unfortunately, at this time, the CIC pertaining to the connection between TA and the first call server 18 has been "lost" to the second node 52 since it is neither communicated nor encoded within the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the connection broker 44 of the first node 40 is arranged to establish 206 a phantom cross-office path between PTx and TA, with information pertaining to this cross-office path typically stored in the terminal number data base 69 by the resolution intelligence 68. In other words, terminal TA is coupled to phantom terminal PTx. Also, the first connection broker 44 is triggered into action by the communication of the modified call message (to the second call server 81).

Specifically, substantially contemporaneously with the sending of the modified call message, the first connection broker 44 of the first node 40 notes that the phantom terminal PTx is one end of an outgoing phantom trunk to the second node 52. The first connection broker therefore passes 208 a connection request 106 to the second connection broker 80 via virtual link 84, which connection request contains the CIC of the phantom trunk and the identity of TA (possibly derived from the original CIC assigned to the trunk between TA and the first call server 18). Typically, the actual address of the call-originating unit, i.e. TA, is sent.

The second node 52 reacts to the modified incoming call message (received on the phantom trunk) by mapping 210 the received circuit indicator code (CIC) of the phantom trunk onto an associated second phantom terminal PTy. Again, the second phantom terminal PTy has been selected by the second call server 81 of the second node 52 from its associated memory 182, with the memory up-dated to record that PTy represents a terminating point of the phantom trunk. Selection of the phantom terminal PTy is on a unique basis.

The second node 52, in response to the second call server 81 receiving the modified incoming call message, already appreciates that the destination of the incoming call ultimately lies with terminal TB. Therefore, at an appropriate time, the second call server 81 requests 212 a connection from TB to the second phantom terminal PTy (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out 214 the two phantom terminals PTx and PTy, converting the two requests "Connect TA to PTx" and "Connect TB to PTy" into the single real connection request "Connect TA to TB". Specifically, the second connection broker 80 is able to deduce the fact that there is a common CIC for the phantom trunk, and so the requirement for a direct connection between TA and TB is identified by virtue of this commonality. The second connection broker 80 then makes an actual trunk connection 216 between TA and TB via the second trunk network adapter 56. At about the same time, the second connection broker 80 (of the second node 52) instructs 218 the first connection broker 44 (of the first node 40) that the path to TB is in place.

Acceptance by the terminal TB of the call, and confirmation of the connection by the second call broker 80 is notified from the second call server 81 to the first call server 18, and the first connection broker 44 a so notifies 116 its associated call server 18 that the path to TB is in place. At this point 220, the first call server 18 may start billing the call.

The phantom trunk remains intact for the whole duration of the call, with tear-down of the broadband connection operating in a complementary sense to the call set-up procedure describes in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue requests to their respective connection brokers. Thereafter, the connection broker at the outgoing end of the phantom trunk will pass its release request onto the other connection broker by sending the CIC of the phantom trunk. The terminating connection broker will issue a clear-down of the broadband connection on receipt of whichever of the two messages it receives first. It is noted that the phantom trunk is not re-useable until both call servers have been told (by their respective connection brokers) that the broadband connection has cleared.

As will be understood, an exemplary address format for each phantom terminal is typically arranged to be a special case of the format used for real (i.e. physical rather than imaginary) terminals. An ASN.1 Object Identifier can be used to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CIC field could be extended to 32 bits (rather than the normal 16 bits) and DPC can then be equated to OPC to identify a "line" type of a terminal while the CIC can be used to identify the line on the exchange. Generally, however, the only requirement for establishing a phantom trunk is for the connection broker to appropriately tag and record (in the terminal number data base 69) such a phantom trunk as either incoming or outgoing.

Turning again to the general architecture of FIG. 2, an ATM network and the International Telecommunications Union, Telecommunications Section (ITU-T) signalling system No. 7 can be utilised to implement the broadband network and narrowband control signalling, respectively.

Particularly, a narrowband node utilises the ISDN User Part (ISUP) of ITU-T signalling system no. 7 to communicate with other exchanges (e.g. narrowband network 52) to support multi-node operation. The exchange terminates some narrowband lines directly and terminates narrowband trunks via trunk network adapter 46 connected to an Asynchronous Transfer Mode (ATM) network 48. The trunk network adapter 46 translates bearer channels to an ATM scheme, with a one-to-one relationship existing between each bearer channel and an ATM virtual channel (VC). Typically, the broadband network edge switches 50, 60–62 and hence the trunk network adapters 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adapters 46, 56–58 using the proxy signalling option of UNI 4.0.

Narrowband signalling to other exchanges can use either existing narrowband connections or can be routed via network adapters (e.g. 46, 58) and the broadband network using either circuit emulation or frame forwarding. The concept is applicable to both fully and quasi-associated signalling schemes. Connections to another mixed mode node are implemented in a similar fashion.

As will now be understood, the connection broker 44 passes narrowband-to-narrowband requests to the narrowband switching fabric 16, while broadband-to-broadband connections (within the same node) are established using proxy signalling to set-up the connection directly. For narrowband-to-broadband connections, two requests are needed, one to the narrowband switching fabric 16 and one to the broadband network edge switches 50, 60–62. However, for a broadband-to-phantom terminal connection, the connection broker passes the connection request to the second connection broker (reference numeral 70 of FIG. 3) at the other end of the phantom route. The connection is then made by using a proxy signalling scheme emanating from the second connection broker 70. It should be noted that the present invention envisages that the phantom terminals are implemented as broadband terminals, and so a narrowband-to-phantom terminal connection is handled as a combination of a narrowband-to-broadband connection and a broadband-to-phantom terminal connection.

It will also be appreciated that the service inter-working function is also applicable to networks that have intermediately coupled broadband networks. In this instance, the interconnection between call servers can provide gateway functions, such as billing and screening, while the connection brokers permit end-to-end connections between the narrowband terminals. Similarly, signalling inter-working functions not otherwise available to respective narrowband networks can be provided by connecting call servers together via the phantom trunks.

In summary, the second connection broker recognises two connection requests have been received to the opposite ends of the same phantom trunk, and in response thereto establishes a direct route through the broadband network between the first subscriber terminal 12 and the second subscriber terminal 68.

The connection mechanism outlined above therefore provides for the interconnection of mixed nodes through an intermediate broadband network which is otherwise unable to interpret and therefore unable to support the control channel signalling protocols separately utilised within the narrowband networks. Such operation could be supported, for example, by a modified trunk network adapter (of a broadband network) equipped with narrowband signalling software, but generally occurs between different infrastructure exchanges. Consequently, by employing this mechanism to establish a common control channel, the modified trunk network adapter can support a narrowband traffic resource to participate in narrowband services without requiring the intervention of a signalling inter-working function.

Beneficially, the combination of phantom trunks and the connection broker architecture results in a system implementation that requires no modifications to present narrowband signalling schemes and which supports all narrowband services. Additionally, only minimal changes are required to existing narrowband call servers. Indeed, this system is scaleable to arbitrarily complex networks and which can operate over any underlying connection fabric including TDM, ATM or Frame Relay.

While the use of phantom trunks is an extremely effective and inventive mechanism for establishing a connection between narrowband trunks and virtual circuits of a broadband network in the face of dissimilar signalling schemes, the mechanism is limited in so much as the underlying mode of operation of the call server does not address the issue of controlling attributes of speech or data path connections once a connection request has been sent by the call server to the connection broker. The present invention is therefore arranged to enhance the basic mechanism and architecture of FIG. 2 to allow a functional modification of an on-going communication in an in-call scenario, and hence to improve overall system functionality and system control. As such, the present invention is able to address, for example, such issues as: i) enabling and disabling echo cancellers; ii) setting and removing loop-backs; iii) enabling and disabling tone detection; iv) controlling tone generation; v) monitoring the generation of continuity tones; and/or vi) enabling and disabling speech paths (or communication paths, generally) in both the forward and reverse directions. The last issue is particularly important because, in many cases, communication systems do not contemporaneously establish forward and reverse directions for a communication, but rather establish (if required) bi-directional communication at a later point in the call, thereby optimising the assignment of communication resources. In other words, communication systems may operate an independent trunking mechanism that supports half-duplex communication in preference to a full-duplex scheme, although full-duplex may be established at a later point in the call.

Turning attention to FIG. 6, a basic block diagram of a communication system architecture according to a preferred embodiment of the present invention is shown. A first call server 18, responsible for overall system control (as previously described), is coupled to a first narrowband-broadband interface (termed an ATMS, or ATM system) 250 which contains a connection broker 44 and associated memory 251 More especially, the first call server 18 is coupled to the connection broker 44 through a fabric application interface (FAI) 66. The connection broker 44 is coupled to both a plurality of network adaptors 58 (that interface to a plurality of narrowband trunk circuits 252–256) and to a switch fabric 16 through control bus 45. The switch fabric is coupled into a broadband network 48 through a multiplicity of virtual circuits 258–262.

The plurality of network adaptors 58 may also be logically coupled to at least one intelligent peripheral 264 that may be realized as an Internet server or other data repository, with the intelligent peripheral physically coupled to the switch fabric 16. Consequently, the ATMS 250 (overseen by the connection broker 44) may route incoming traffic directly to the intelligent peripheral 264 and then loop-back requested data or information to the request-originating unit. As such, the request-originating unit may only make use of narrowband trunk circuits or broadband virtual circuits at a particular time, but not necessarily both simultaneously. The first call server 18 will also typically be coupled to a second call server 81, which second call server 81 will in turn be coupled to a second ATMS 266. The second ATMS 266 is then coupled to a broadband network, such as broadband network 48.

Generally, the connection broker 44, each network adaptor, the switch fabric and the intelligent peripheral each contain control processors (270–274) that principally function to control the routing of data. Indeed, in a software-driven environment, these control processors operate to open and close circuit connections, and conduct general housekeeping and maintenance tasks (including the generation of status reports and system integrity tests). A control processor 279 of the call server 18 generally oversees the operation of the ATMS 250, including control functions associated with the set-up and tear-down of calls. The control processor 279 therefore has access to the associated memory 19, as will readily be appreciated.

In order to allow the present invention the ability to control attributes (such as, for example, call set-up and tear-down messages and the provision of echo cancellers) in an existing connection, a modified operating protocol (preferably based on the Q.2931 signalling) is used to present a uniform signalling scheme (i.e. a consistent view) across the fabric adapter interface 66 between a call server and a connection broker. Moreover, the preferred embodiment of the present invention provides a uniform view of both a virtual channel connection (VCC) of the FAI 66 as well as ensuring a unified behavioural pattern associated with the generator of the data on the VCC.

To achieve the enhanced system functionality of the present invention, the memory 251 associated with the connection broker 44 contains a short term database 280 that stores connection (call) related information pertaining to: trunk and virtual circuit identities (CICs and VCIs, respectively); addresses of assigned network adaptors (including port information and type); broadband (ATM) switch information; a call reference identity; connection attributes for lower level system entities; and/or signalling protocols and protocol converters required for effective communication to the call server 18 (across the FAI 66) and other interconnected equipment, such as the network adaptors 58 and the switch fabric 16. More particularly, at call set-up, a call reference identity (as defined in Q.2931) is assigned to the connection, which call reference identity is included in a call set-up message, such as a SET-UP primitive. The call reference identity is stored in the short-term database 280 associated with the connection broker 44. Moreover, the call reference identity is therefore available to both the call server 18 and the connection broker 44, and may be stored in the memory 251 associated with the connection broker 44. Further, at call set-up, an initial selection of attributes (rather than default values) may be assigned to the call, which attributes are identified in the SET-UP primitive and which are therefore also associated with the call reference identity and stored in the memory 251 of the connection broker 44. The set-up message (realised in a preferred embodiment by a modified SET-UP primitive) also includes originating address fields for identifying the calling unit and destination address fields for identifying the destination unit.

Subsequently, when a connection needs to be modified in-call, a MODIFY REQUEST primitive (in the case of the preferred embodiment of the present invention) is encoded with the call reference identity of the connection and is sent across the FAI 66. The MODIFY REQUEST primitive further includes alteration fields that allow attributes, such as the requirement and provision of an echo canceller, to be changed. Typically, these alteration fields will comprise data bits and groups of data bits that have a pre-ordained meaning, i.e. the alteration fields are structured into a defined frame format. The connection broker 44, upon receipt of the MODIFY REQUEST primitive, accesses its associated memory 251 to correlate the call reference identity in the MODIFY REQUEST primitive with the corresponding call reference identity and the previously stored attributes (originally) associated therewith. The connection broker 44 is then able to update the attributes to reflect the changes identified in the MODIFY REQUEST primitive.

The connection broker 44 then identifies the appropriate communication protocol (inherently associated with the stipulated change in system configuration, e.g. the inclusion of an echo canceller or the provision of a reverse path), and sends (or transmits in a radio frequency environment) appropriate control signals to the a network adaptor, for example, to alter the configuration of the network adaptor. Substantially contemporaneously (and if required), the connection broker 44 may also send control information to other lower-level equipment, such as the switch fabric or the intelligent peripheral, to effect their operation and hence potentially change connectivity within the broadband network. As such, the sending of control information can be restricted to either a solitary lower-level device (e.g. a network adaptor or the switch fabric) or substantially simultaneously to multiple lower-level devices (e.g. a network adaptor the switch fabric and an intelligent peripheral).

Consequently, unlike conventional systems in which the MODIFY REQUEST primitive relates to attributes (such as quality of service, data rate and compatibility fields) of the broadband network only as it pertains to a virtual channel connection, the MODIFY REQUEST primitive (as used in the preferred embodiment of the present invention) has an extended interpretation that also relates these attributes to corresponding physical behavioural configurations, for example, of the network adapter within the ATMS. Therefore, at a system level, operation according to the preferred embodiment of the present invention is eased by virtue of the fact that one command function (e.g. the MODIFY REQUEST primitive) provides a global system command (by virtue of the fact that the connection broker 44 interprets the command and accordingly instructs lower-level system entities in an appropriate signalling scheme). Therefore, system development is de-coupled and made independent from control signalling.

In a similar vein, the MODIFY REQUEST primitive can also be used by the connection broker 44 to notify the call server of a change in system configuration. For example, in response to receipt of a MODIFY REQUEST primitive from the broadband network (e.g. to reduce assigned bandwidth for the connection), the connection broker 44 is triggered to notify the call server that, for example, the higher bandwidth is no longer available. Again, the connection broker would typically store this information in its associated memory 251.

The present invention therefore also provides an association of the physical configuration of a network adapter, for example, to a high level Q.2931 signalling message (between a call server and a connection broker) related to an attribute. Consequently, there is a physical association between circuits and signalling at a connection broker level, which association optimises system operation. In this way, the call server 18 does not need to know (and can remain oblivious to) the form of signalling and control exerted by the connection broker on lower level system entities, such as network adaptors and switch fabrics. Consequently, the entire system can be developed and expanded, with only the connection broker necessarily requiring change (in relation to its associated memory and mode of operation, e.g. its signalling in relation to lower level entities) to support modification of the system, in general. In other words, the connection broker functions as an interface for both the control of signalling and the functional configuration of the lower-level network entities.

Briefly referring to FIG. 7, typical frame structures of a SET-UP primitive 300 (as defined in Q.2931) and a MODIFY REQUEST primitive 310 (as defined in Q.2963.1) are shown.

The SET-UP primitive 300 typically includes framed data comprised from a series of contiguous information fields. Specifically, the SET-UP primitive 300 is structured to include a protocol discriminator field 302 for identifying the format of signalling adopted in the communication and a call reference identity field 304. The SET-UP primitive 300 further includes a message-type field 306 that identifies the type of message contained in the frame and a message length indicator 308. The SET-UP primitive 300 also has an ATM traffic discriptor field 310 for identifying a selected type of broadband connection, and a broadband bearer capability field 312 that stipulates the functional parameters required to support the connection in the broadband network. To identify both the called party and the calling (call originating) party, the SET-UP primitive 300 further includes separate fields for a called party number 314, a called party sub-address 316, a calling party number 318 and a calling party sub-address 320. Finally, the SET-UP primitive 300 has a quality of service parameter field 322 and a connection attribute field 324. The bearer capability field 312 and the connection attribute field complement one another to define fully the functional requirements of the call.

Figure 8C:
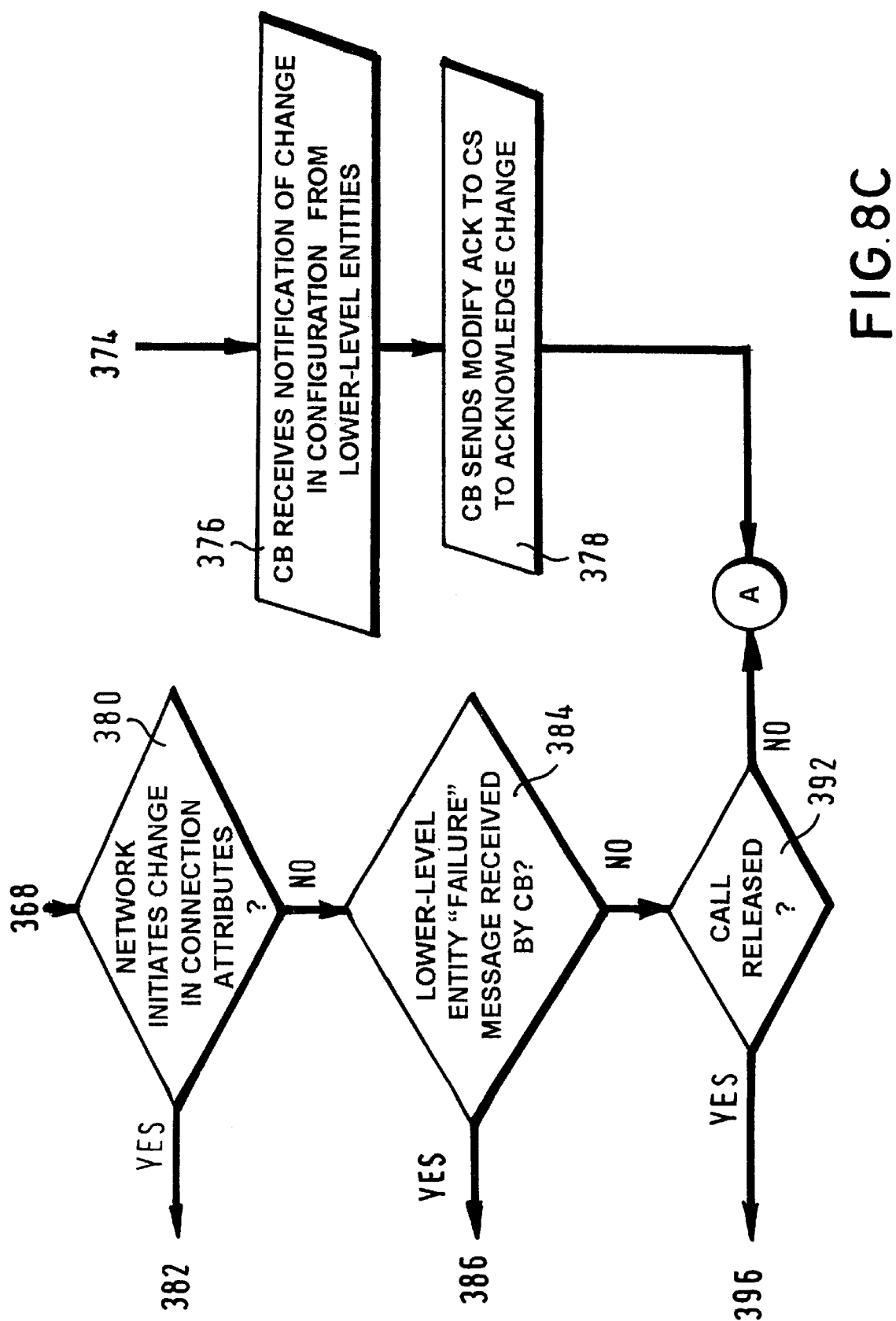

In relation to a MODIFY REQUEST primitive 330, this primitive has a frame structure that possesses a protocol discriminator 302, a call reference identity field 304, a message-type field 306 and an associated message length indicator 308. The MODIFY REQUEST primitive 330 similarly includes an ATM traffic discriptor field 310 and a connection attribute field 324 that can accept various data words to define changes or different in-call requirements for a call. As such, the MODIFY REQUEST primitive will typically contain less data fields, while the overall length of the frame may vary on a frame-by-frame basis. As previously indicated, for the successful identification of a call or associated circuit, the MODIFY REQUEST primitive 330 need only contain the call reference identity 304 because this field uniquely identities each connection in the network. Finally, FIG. 8 shows a flow process underlying a preferred operating mechanism for the communication system architecture of FIG. 6.

The process begins at step 350 where the network is idle and no connections are established across or through the narrowband-broadband interface 250. In response to an IAM (or the like) from a subscriber terminal, a call reference identity is established 352 (i.e. assigned by the call server) for the connection. Substantially contemporaneously, the call se-ver sends a SET-UP primitive to the connection broker 44. The call reference identity is therefore known to both the call server and the connection broker, with the call reference identity stored by the connection broker in its memory 251.

The connection broker, at step 356, determines whether the SET-UP primitive contains any attributes. In the affirmative, the connection broker associates and stores these attributes against the call reference identity 358 and uses predetermined default attributes for all unspecified attributes for the lower-level system entities. In the negative, the connection broker uses (and stores against the unique call reference identity for the connection 360) predetermined default attributes for the lower-level system entities. More explicitly, the connection broker uses default attribute values on a per attribute basis, i.e. the connection broker will use the defaults for all attributes other than those specifically altered within the SET-UP primitive.

As will be understood, the term "lower-level system entities" relates to the infrastructure that principally establishes the physical connections between trunk circuits and virtual channels, although the term also includes service-orientated equipment such as intelligent peripherals and call announcement servers, for example.

Following association of connection attributes to the call reference identity, the connection broker references its memory 251 (which, in fact, may be realised in the terminal number database 69 of FIG. 3) to determine the appropriate protocol converter(s), if any, required to send an instruction for connection down to the requisite lower-level system entity or entities. Therefore, if necessary, the Q.02931-based SET-UP primitive is converted into different signalling schemes that are compatible with providing instructions (step 362) to configure the hardware of the narrowband-broadband interface 250 to support the attributes stipulated in the SET-UP primitive. Upon receipt of suitably formatted instructions, the lower-level entities can adopt the necessary configuration to support a through-path (step 364).

Once the appropriate connections have been established by the lower-level entities, the connection broker typically receives a notification from each of the corresponding lower-level entities stating that the necessary circuits are in place; the connection broker then informs the call server of this fact by sending a SET-UP ACKNOWLEDGE 366 (having a structure defined in ITU-T Q.2931). The connection is now established and the call (either voice or data) can commence.

In the event that the call server independently demands 368 a change in assigned attributes, e.g. to support a higher priority call, the connection broker receives a MODIFY REQUEST primitive from the call server, as previously described. In the affirmative 370, the connection broker searches for the call reference identity and updates the associated record with the new attributes (step 372). The connection broker may then need to reference the protocol converters before instructing 374 lower-level system entities to support the new attributes through revision of their individual hardware (or software) configurations. Typically, following any change in the operational state or configuration of a particular lower-level system entity, the effected lower-level system entity will notify the completion (or success) of the change to the connection broker (step 376), with the connection broker 44 then sending 378 a MODIFY ACKNOWLEDGE primitive to the call server to acknowledge that the change has occurred. Advantageously, the MODIFY REQUEST does not have to be sent out of contest, and a MODIFY ACKNOWLEDGE primitive is sent to acknowledge receipt of the instruction to change attributes in-call. Following notification to the call server, the flow may return to decision block 368.

Returning to the negative path from decision block 368, the process can otherwise continue with the connection broker determining whether the network has initiated a change in connection attributes (step 380). It is noted that this scenario covers the case of a subscriber terminal requesting a change in its operating parameters because subscriber requests are initially interpreted by the connection broker and hence appear as messages projected downward (from the connection broker) into the lower-level system entities. If the network has initiated a request, then the connection broker informs the call server by sending a MODIFY REQUEST and may also record the requested change in attributes (step 382). Flow then proceeds back to step 368 where the call server can act, if appropriate, to change the connection attributes of a call (by employing steps 368 to 378 inclusive).

The negative path from decision block 380 may, optionally, enter a system management block that determines whether the connection broker is in receipt of an equipment failure message (transmitted from one or more lower-level system entities at step 384). In the affirmative, the connection broker informs the call server of the failure in a NOTIFY-type primitive of the Q.2931 signalling scheme, and then (preferably) records the failure of the particular circuit, function or lower-level system entity in its memory (step 386). The connection broker may then remain in a loop 388 to check periodically to see if the circuit, function or lower-level system entity has been repaired (or becomes available). Indeed, a lower-level system entity may, in fact, independently send an on-line availability message to the connection broker, with this process particularly applicable to new infrastructure that has been introduced into a working network. Once the connection broker resolves the fact that the circuit, function or lower-level system entity has become available, the connection broker informs the call server of the availability of the circuit, function or lower-level system entity (step 390). Consequently, the call server may wish to reconfigure the network to tare into account the additional functionality or equipment, and so may independently request changes in the network configuration. Generally, after step 390, the flow is terminated at step 398 and the entire procedure started again (at step 350).

Following a negative path from decision block 384, the process determines whether the call is to be released (step 392). If the call is on-going, then the process returns to decision block 368. Alternatively, if the call is to be terminated 394, then the call server and connection broker interact to clear-down the connections and to delete the call reference identity (step 396). The process can then end at step 398.

Generally, the connection broker 44 utilises a processor to control the timing and sending of commands and messages, which processor is also able to interpret the differing signalling protocols through its ability to access the call related information and protocol converters stored in the associated memory 251, as will be understood. In the case of the connection broker, the processor may be realised by the resolution intelligence (reference numeral 68 of FIG. 3), although a dedicated control processor may be provided within the connection broker.

The present invention advantageously is therefore able to change both in-call attributes (of a complex nature) and overall system configuration using a single instruction set across the FAI, and thus ensures that the operating protocol of the connection broker needs to be modified, i.e. either the memory associated with the connection broker needs to be updated or the entire connection broker needs to be replaced. Indeed, the present invention further allows the distribution of infrastructure components across a network, while maintaining a telecommunications network as standards compliant. Beneficially, the present invention is also therefore capable of handling more complex connection attributes at any time during or after call set-up.

It will be appreciated that the use of the protocol converters can be implemented independently of the use of a modified Q.2931-based signalling protocol that facilitates in-call changes to connection attributes. In other words, the connection attributes can be changed in-call (according to an aspect of the present invention) be the sole provision of a connection broker and an complementary signalling scheme, perhaps based on MODIFY REQUEST or NOTIFY primitives.

It will, of course, be appreciated that the above description has been given by way of example only and that modification in detail may be made within the scope of the present invention. For example, changes to an attribute can be sent to the connection broker in a series of messages (i.e. contained in many potentially contiguous primitives), with the connection broker only actioning a system change when all related information has been collected. In this latter respect, system operation would only be changed with the simultaneous issuance to and receipt of suitable commands by all related lower-lever entities. Furthermore, the process of FIG. 8 can clearly be modified by re-ordering the process steps and/or by eliminating signalling or including supplementary signalling acknowledgements between the connection broker and lower-level system entities, such as the network adaptors 58 or intelligence peripheral 264. For example, the reporting of a lower-level entity failure by the connection broker is an independent process to in-call operation, but the step has been included to reflect a subsequent failure of a circuit, for example. Additionally, while the preferred embodiment of the present invention has the connection broker store call related attributes, it will be appreciated that these attributes could be stored within the appropriate lower level system entities. In this alternative (distributed attribute-storage) arrangement, the connection broker must therefore receive both calling party and called party address information in order that it can resolve out and identify which lower level system entities are used within the connection whose attributes are being changed.

What is claimed is:

1. A communication network comprising:
    a call server arranged to administer control of at least a portion of the communication network;
    a plurality of interconnectable lower-level system entities controllable by the call server and configurable to provide a plurality of circuits that support a flow of data within the communication network, the lower-level system entities being selected from the group consisting of: infrastructure that establishes the physical connection between trunk circuits and virtual channels, and service-orientated equipment including intelligent peripherals and call announcement servers; and
    a connection broker coupled to the call server and the plurality of lower-level system entities and arranged to relay system configuration messages between the call server and the plurality of lower-level system entities, the connection broker having:
    a memory-processor combination arranged to store and access, as necessary, protocol converters in response to receipt of system configuration messages from one of the call server and the plurality of lower-level system entities to facilitate and provide intelligible system configuration messages to a respective one of the plurality of lower-level system entities and the call server.

2. The communication network according to claim 1, wherein the connection broker is coupled to the call server through a fabric application interface supporting a first signalling scheme and the connection broker is coupled to the plurality of lower-level system entities through a plurality of control buses at least one of which uses a second signalling scheme different to the first signalling scheme.

3. The communication network according to claim 2, wherein the call server controls the interconnection of a narrowband network to a broadband network.

4. The communication network according to claim 3, wherein the lower-level system entities include at least some of intelligent peripherals, network adaptors and switch fabrics.

5. The communication network according to claim 4, wherein at least some of the lower-level system entities are contained in a narrowband-broadband interface.

6. The communication network according to claim 4, wherein the broadband network supports an asynchronous transmission mode.

7. A method of communicating system configuration messages between a call server arranged to administer control of at least a portion of a communication network and a plurality of interconnectable lower-level system entities controllable by the call server and configurable to provide a plurality of circuits that support a flow of data within the communication network, the lower-level system entities being selected from the group consisting of: infrastructure that establishes the physical connection between trunk circuits and virtual channels; and service-orientated equipment including intelligent peripherals and call announcement servers; the communication network further comprising a connection broker coupled to the call server and the plurality of lower-level system entities and wherein the connection broker has a memory and a processor, the method comprising the steps of:
    storing in the memory protocol converters that translate system configuration messages between a first signaling format and at least one other different signaling format;
    relaying system configuration messages between the call server and the plurality of lower-level system entities via the processor of the connection broker; and
    as necessary, having the processor access the protocol converters in response to receipt of system configuration messages from one of the call server and the plurality of lower-level system entities to facilitate and provide intelligible system configuration messages to a respective one of the plurality of lower-level system entities and the call server.

8. The method of communicating system configuration messages according to claim 7, wherein the connection broker is coupled to the call server through a fabric application interface supporting a first signalling scheme and the connection broker is coupled to each of the plurality of lower-level system entities through a control bus at least one of which uses a second signalling scheme different to the first signalling scheme.

9. The method of communicating system configuration messages according to claim 7, wherein the system configuration information transferred across the fabric application interface is based on at least one of a Q.2931 signalling protocol and a Q.2963 signalling protocol.

10. A connection broker for coupling between a call server arranged to administer control of at least a portion of a communication network and a plurality of interconnectable lower-level system entities controllable by the call server and configurable to provide a plurality of circuits, the lower-level system entities being selected from the group consisting of: infrastructure that establishes the physical connection between trunk circuits and virtual channels; and service-orientated equipment including intelligent peripherals and call announcement servers; the connection broker responsive to and arranged to relay system configuration messages between the call server and the plurality of lower-level system entities, the connection broker having:
    a memory-processor combination arranged to store and access, as necessary, protocol converters in response to receipt of system configuration messages from one of the call server and the plurality of lower-level system entities to facilitate and provide intelligible system configuration messages to a respective one of the plurality of lower-level system entities and the call server.

11. A method of altering connection attributes associated with a connection established by a call server of a communication system and routed via circuits responsive to lower-level system entities controlled by the call server, the lower-level system entities being selected from the group consisting of: infrastructure that establishes the physical connection between trunk circuits and virtual channels; and service-orientated equipment including intelligent peripherals and call announcement servers; the lower-level system entities coupled to the call server via an intermediate connection broker that acts as a control interface between the call server and the plurality of lower-level system entities, the method comprising the steps of:

storing within the communication system an initial set of connection attributes for the connection;

receiving at the connection broker a message identifying an alteration in the connection attributes associated with the connection;

sending a control message from the connection broker notifying the alteration of the connection attributes associated with the connection; and changing the initial set of connection attributes associated with the connection in response to receiving the control message from the connection broker.

12. The method of altering connection attributes according to claim 11, further comprising the step of:

substantially contemporaneously with the step of changing the initial set of connection attributes, storing within the system a new set of connection attributes associated with the connection.

13. The method of altering connection attributes according to claim 11, further comprising the steps of:

at the beginning of a call, assigning a call reference to the connection, and sending the call reference within the control message to identify the connection.

14. The method of altering connection attributes according to claim 11, wherein the step of storing involves storing connection attributes at the connection broker.

15. The method of altering connection attributes according to claim 11, wherein the step of storing involves storing connection attributes at at least one of the plurality of lower-level system entities.

16. The method of altering connection attributes according to claim 11, wherein the step of receiving a message identifying an alteration further comprises the step of:

triggering generation of the message within the communication system.

17. The method of altering connection attributes according to claim 11, wherein the step of receiving a message identifying an alteration further comprises the step of:

triggering generation of the message at the call server.

18. The method of altering connection attributes according to claim 17, wherein the step of generating the message at the call server is in response to the step of the call server determining that a change in connection attributes associated with at least one connection is required to optimise operation of the communication system.

19. The method of altering connection attributes according to claim 11, wherein the step of receiving a message identifying an alteration further comprises the step of:

triggering generation of the message at one of the plurality of lower-level system entities.

20. The method of altering connection attributes according to claim 19 wherein the message is triggered at least one of:

a fault within one of the lower level system entities, whereby the fault inhibits an operational capability of the respectively effected lower-level system entity;

introduction of a new lower-level system entity into the communication system; and alteration of an operational capability of a lower-level system entity.

21. The method of altering connection attributes according to claim 20, wherein the control message is based on a MODIFY REQUEST primitive.

22. The method of altering connection attributes according to claim 11, further comprising the steps of:

receiving the message identifying an alteration in the connection attributes in a first signalling protocol;

at the connection broker, translating the message into a different signalling protocol; and sending the control message in the different signalling protocol.

23. The method of altering connection attributes according to claim 11 further comprising the step of:

notifying the connection broker when changes to the connection attributes associated with the connection have been implemented.

24. The method of altering connection attributes according to claim 23, further comprising the step of:

sending an acknowledge message from the call server.

25. The method of altering connection attributes according to claim 24, wherein the acknowledge message is based on a MODIFY ACKNOWLEDGE primitive.

26. A connection broker providing a control interface between a call server arranged to administer control of at least a portion of a communication network and a plurality of interconnectable lower-level system entities controllable by the call server and configurable to provide a plurality of connections, the lower-level system entities being selected from the group consisting of: infrastructure that establishes the physical connection between trunk circuits and virtual channels; and service-orientated equipment including intelligent peripherals and call announcement servers; the connection broker responsive to and arranged to relay a system configuration message between the call server and the plurality of lower-level system entities, the connection broker having:

a controller arranged to send, in response to receipt of the system configuration message, an attribute instruction that causes a change in a configuration of the plurality of lower-level system entities.

27. The connection broker of claim 26, wherein the attribute instruction alters initial connection attributes associated with an on-going connection.

28. The connection broker of claim 26, wherein the attribute instruction is based on a MODIFY REQUEST primitive.

29. The connection broker of claim 26, wherein the attribute instruction is based on a NOTIFY primitive.

30. A communication network comprising:

a call server arranged to administer control of the communication network;

a plurality of interconnectable lower-level system entities controllable by the call server and configurable to provide a plurality of circuits that support a flow of data within the communication network, the lower-level system entities being selected from the group consisting of: infrastructure that establishes the physical connection between trunk circuits and virtual channels; and service-orientated equipment including intelligent peripherals and call announcement servers; and a connection broker coupled to the call server and the plurality of lower-level system entities and arranged to relay system configuration messages between the call server and the plurality of lower-level system entities, the connection broker having a controller arranged to send, in response to receipt of the system configuration message, an attribute instruction that causes a change in a configuration of the plurality of lower-level system entities.

31. The communication system of claim 30, wherein the connection broker further comprises a memory for storing protocol converters, and wherein the controller, as necessary and in response to receipt of system configuration messages from one of the call server and the plurality of lower-level system entities, accesses the protocol converters to facilitate and provide intelligible system configuration messages to a respective one of the plurality of lower-level system entities and the call server.

* * * * *